United States Patent [19]

Shackelford et al.

[11] Patent Number: 4,470,431

[45] Date of Patent: Sep. 11, 1984

[54] SYRINGE VALVE AND CLAMPING MECHANISM

[75] Inventors: Carl L. Shackelford, San Pable; John F. Eckert, San Rafael, both of Calif.

[73] Assignee: American Hospital Supply Corporation, Evanston, Ill.

[21] Appl. No.: 351,527

[22] Filed: Feb. 23, 1982

[51] Int. Cl.[3] .............. F16K 11/02

[52] U.S. Cl. .............. 137/625.11; 251/180; 73/864.34; 141/104; 141/372

[58] Field of Search .............. 137/625.11; 251/180, 251/148; 73/863.84, 864.34, 864.62; 141/27, 104, 372

[56] References Cited

U.S. PATENT DOCUMENTS

| | | | |
|---|---|---|---|
| 914,407 | 3/1909 | Gold | 251/180 |
| 1,726,479 | 8/1929 | Engle | 141/372 |
| 2,166,875 | 7/1939 | Overbeke | 137/625.11 |
| 3,116,757 | 1/1964 | Donguy et al. | 137/625.11 |
| 3,297,053 | 1/1967 | McKinney | 251/180 |
| 3,533,444 | 10/1970 | Lyon | 137/625.17 |
| 3,687,163 | 8/1972 | Nickels | 137/625.11 |
| 3,837,360 | 9/1974 | Bubula | 137/625.11 |
| 3,995,494 | 12/1976 | Muller et al. | 137/625.11 |
| 4,120,202 | 10/1978 | Range et al. | 73/864.34 |

FOREIGN PATENT DOCUMENTS

| | | | |
|---|---|---|---|
| 214318 | 4/1924 | United Kingdom | 251/180 |

*Primary Examiner*—Alan Cohan
*Assistant Examiner*—John A. Rivell
*Attorney, Agent, or Firm*—James F. Mitchell

[57] ABSTRACT

A syringe valve and clamping mechanism for an automated liquid dispenser using a demountable precision metering syringe for automatically dispensing reagents or diluting samples with reagent.

4 Claims, 9 Drawing Figures

SYRINGE VALVE AND CLAMPING MECHANISM

This invention relates generally to syringe valve and clamping mechanisms for the demountable precision metering syringe of an automated liquid dispenser and more particularly to a rotatable multiport valve and a mechanism for centering and clamping the syringe to the valve.

One object of the invention is to provide a valve body with mating rotor which may be rotated in either direction about a rotational axis to align a syringe-communicating port with one or more outlet/inlet ports.

Another object of the invention is to provide a valve body and rotor configuration having mating rotational surfaces which maintain a fluid-tight sealing relationship despite surface wear.

Still another object of the invention is to provide a clamping means for a demountable syringe to a valve body wherein the syringe is centered upon the valve body in aligned relation to the reciprocatory syringe actuator drive.

An object of the invention is to provide a quick-release syringe clamping arrangement in a dispensing instrument whereby demountable precision metering syringes of different sizes can be quickly and simply centered and interchanged.

Other objects and advantages of the invention will become apparent upon consideration of the following written description and the accompanying drawings wherein.

Figure 1:
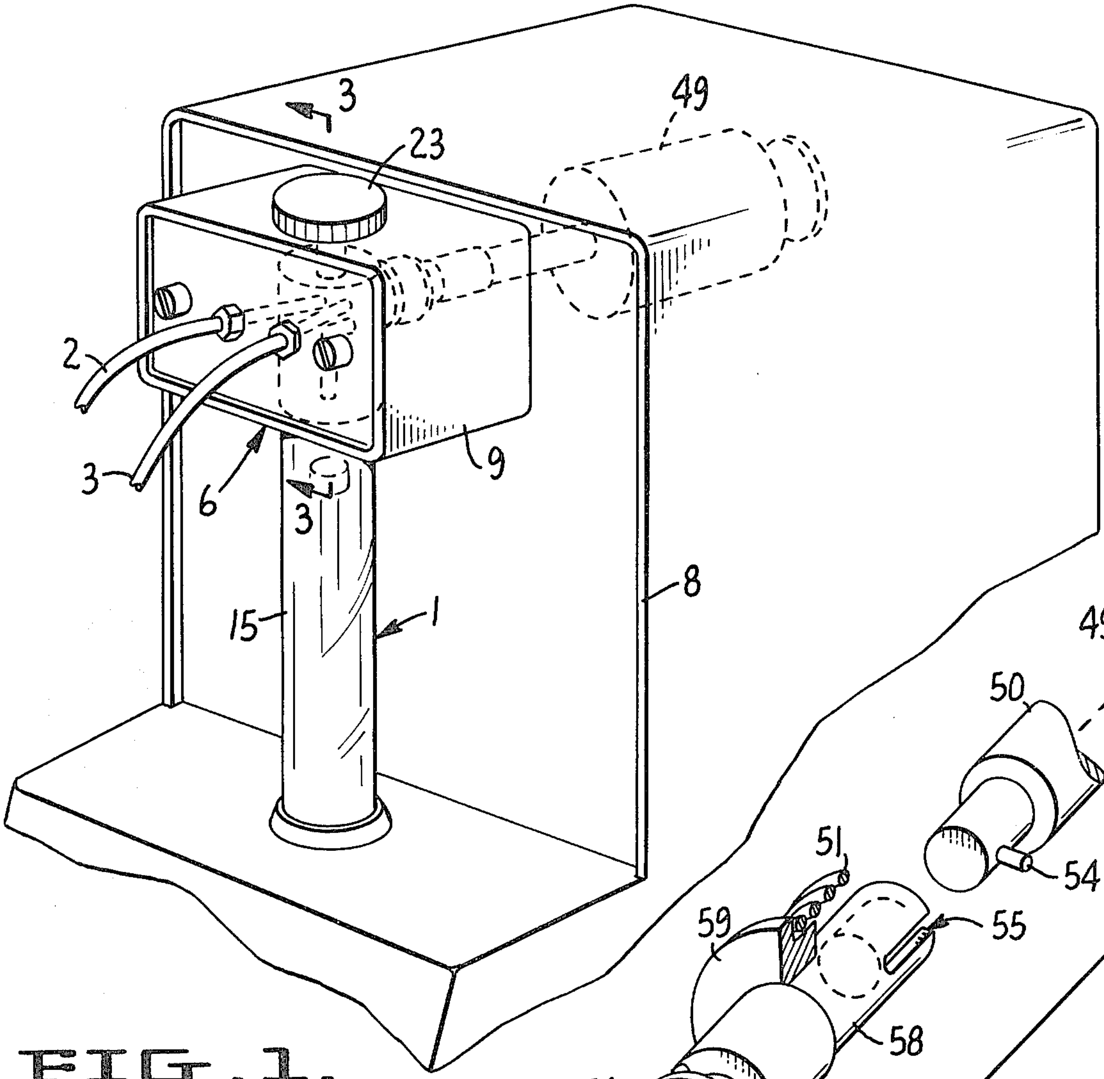
FIG. 1 is an overall perspective view of the valve and clamping mechanism for a liquid dispenser using a single demountable syringe.
Figure 2:
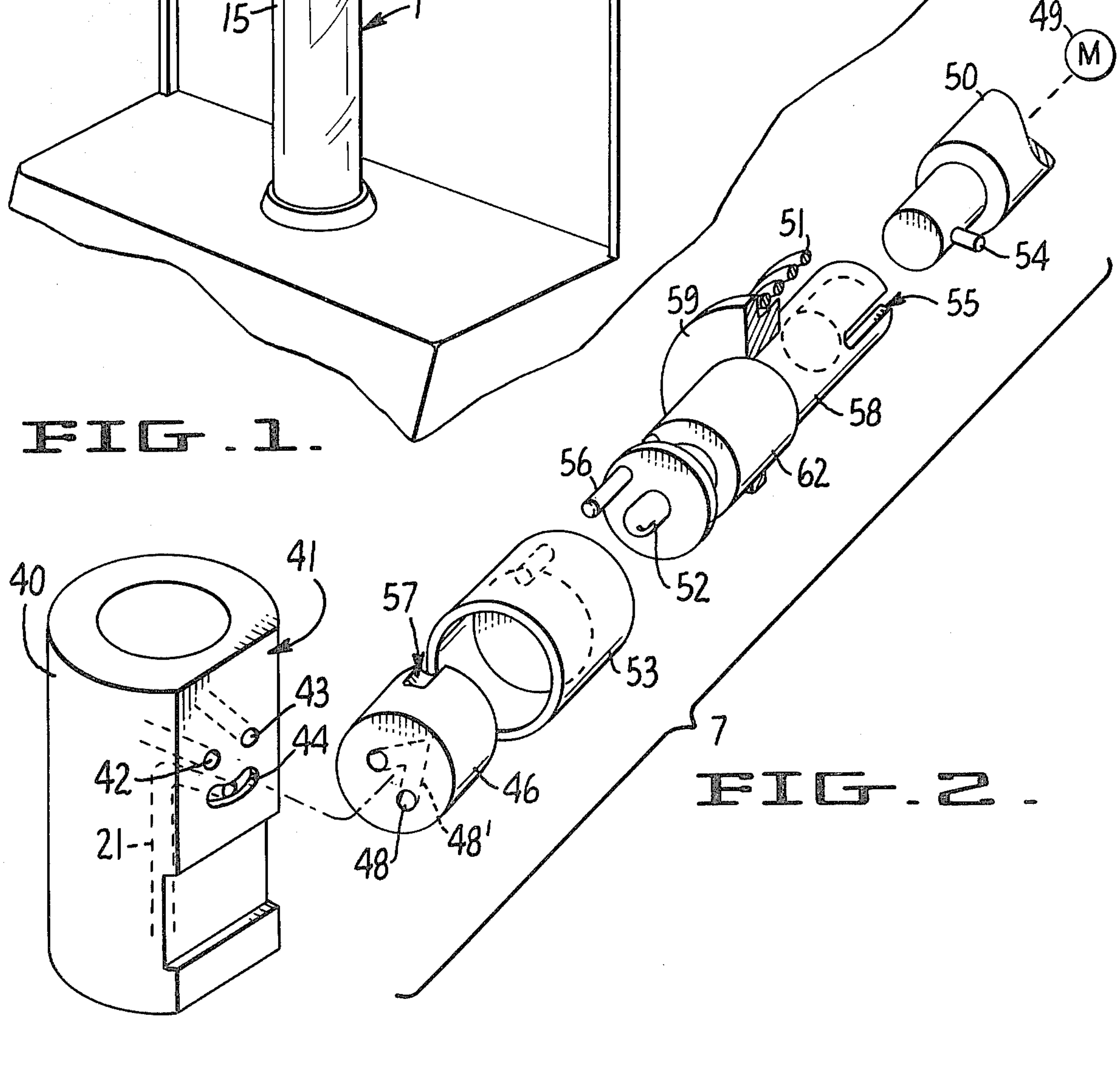
FIG. 2 is an exploded perspective view illustrating the valve and valve actuator means for a typical metering syringe.

The instrument illustrated in FIG. 1 is designed for actuating a single demountable metering syringe. The invention is useful also for operating more than one syringe with appropriate valving and actuator changes which will be apparent from a consideration of the following description.

The instrument includes a precision metering syringe 1 arranged for drawing sample by means of an inlet probe conduit 2 from a test tube, for example, or for dispensing sample or reagent-diluted sample through an outlet conduit 3 into a test tube, as is shown in copending application Ser. No. 06/297,955 filed Aug. 31, 1981 by Robert A. Bilbrey. The instrument also is capable of withdrawing reagent from a reservoir, such as from a beaker, and then using it to dilute a sample or otherwise to be dispensed from the probe conduit.

The metering syringe 1 mounts at its rod end upon a syringe actuator and at its blind end is in fluid-tight communication with valve means 6 as is shown in FIG. 1. The syringe actuator, valve means 6 and its valve actuator, referred to generally as 7, mount upon a rigid frame 8. A valve housing 9 of chemical resistent material encloses the valve and clamping components, whereas the metering syringe is open for observation and ease of removal and replacement.

Figure 3:
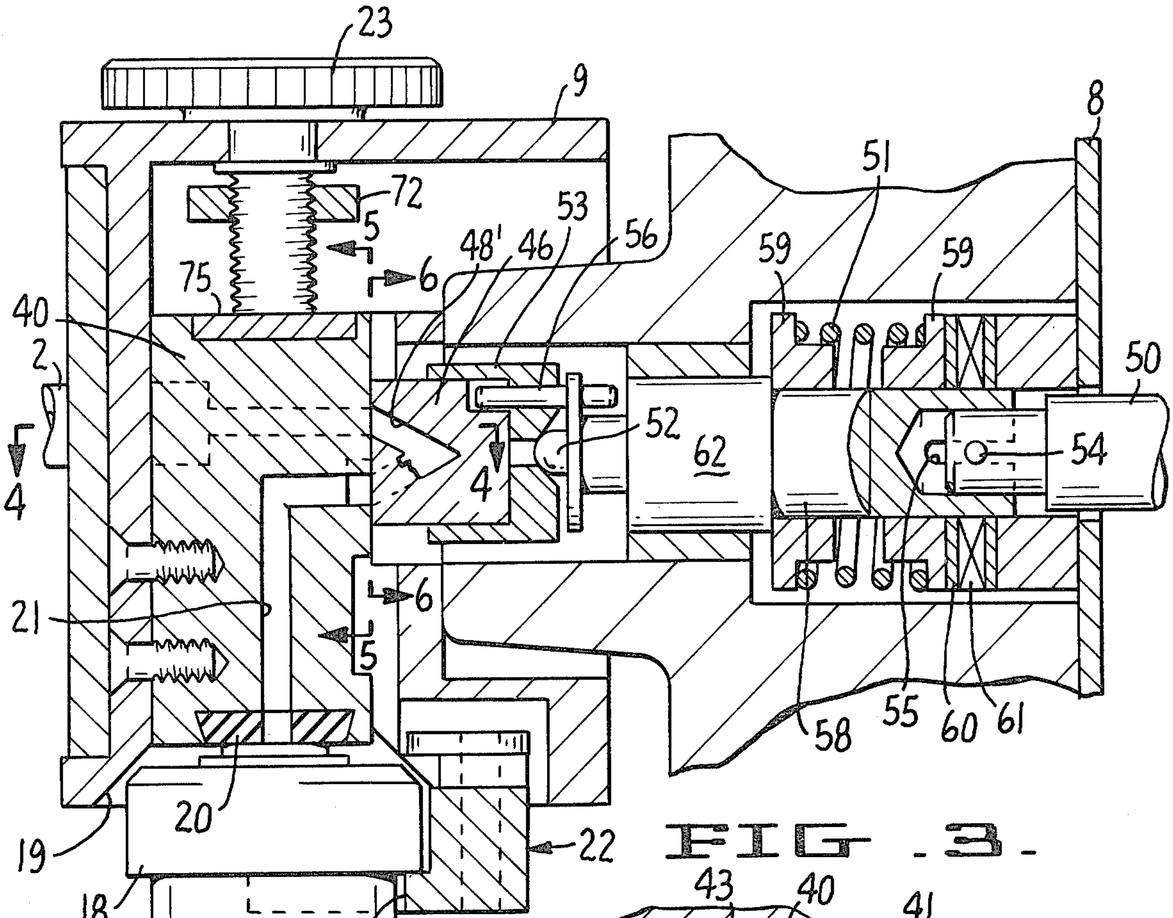
FIG. 3 is a vertical cross-sectional view of the valve and clamping means taken along line 3—3 of FIG. 1.
Figure 4:
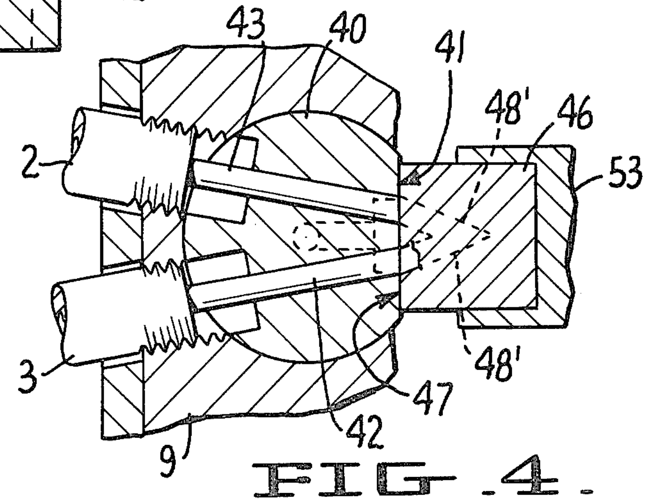
FIG. 4 is a horizontal sectional view of the valve means taken along line 4—4 of FIG. 3.

The metering syringe, as is more particularly shown in FIG. 3, includes a precision ground glass cylinder 15 wth a piston carried on a piston rod reciprocable within the cylinder. A connecting flange and seat 18 seals upon the blind end of the cylinder. The seat fits within a recess 19 in the valve housing 9 that mounts upon the frame 8. The connecting flange 18 is clamped to and seated upon the valve means 6 by clamping means 22 including set-screw 23.

The connecting flange 18 mates with a resilient sealing gasket 20 mounted within the valve body 40. The connecting flange and seat 18 has a through-bore which communicates with the central bore in gasket 20 and a syringe-communicating conduit 21 in the valve body. The clamping means 22, as is hereinafter explained, centers the syringe on the syringe-communicating conduit 21 and aligns it with the stroking of the syringe actuator of the type that is more particularly described in copending application Ser. No. 06/297,955.

Figure 5:
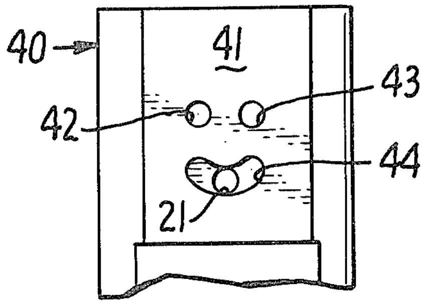
FIG. 5 is an elevational view of the valve seat taken along line 5—5 of FIG. 3.
Figure 6:
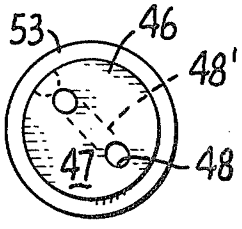
FIG. 6 is an elevational view of the rotor seating face taken along line 6—6 of FIG. 3.

The valve means 6 mounted in fluid communication with the blind end of the metering syringe is shown in detail in FIGS. 2–6. It includes a valve body 40 having a generally planar valve seat 41 bored with ports 42, 43, and 44 as illustrated in FIG. 5. Port 44 is arcuate in shape as shown in FIG. 5 and communicates with one end of syringe-communicating conduit 21 bored into the valve body 40. Port 42 communicates with conduit 3 and port 43, with probe conduit 2, respectively. Each of illustrated ports 42, 43, 44 is equidistant from the rotational axis of a mating rotor 46.

The spring-loaded rotor 46 presents a renewable seating face 47 having a fluid communication groove 48, comprising a pair of internally intersecting bores 48', which communicates one or the other of the ports 42, 43 with arcuate syringe-communicating port 44 in a programmed selection sequence by valve actuator means 7.

The valve actuator 7 may be a drive motor 49 geared to a drive shaft 50. Spring 51, hemispheric or ball shaped bearing end 52 carried on drive tang 58 and sleeved pressure pad 53 biases the seating face 47 of rotor 46 in fluid-tight seating relationship against the valve seat 41. The pin 54 carried on drive shaft 50 mates with a recess 55 in the drive tang 58 and pin 56 on the drive tang mates through sleeved pressure pad 53 with recess 57 in rotor 46 to enable the actuator means 7 to rotate the groove 48 into selected communication between valve port 44 and one or the other of ports 42, 43. The bias spring 51 seats upon spring seats 59 slidably mounted upon the drive tang 58, one bearing against a collar on the drive tang and the other upon thrust washer 60 and thrust bearing 61 carried upon frame 8. The drive tang rotates in sintered bronze journal bearing 62 also mounted upon the frame.

The valve seat 41 on the valve body 40 and the mating seating face 47 of the rotor 46 are shaped in conformance with one another for fluid-tight contact. In the described embodiment the valve body has a planar valve seat 41 which mates with a planar seating face 47 on the rotor 46. As these mating faces rotate with respect to one another, they retain a fluid-tight relationship regardless of wear by abrasion. Any non-conformance in alignment is accommodated by the single point drive through ball 52 bearing upon the sleeved pressure pad 53 along the drive rotational axis. Conforming seating face configurations other than flat planar faces also may be used.

Pin 54 and recess 55 and pin 56 and recess 57 in the rotor 46 provide a positive drive in either direction about the rotational axis. This feature accommodates bidirectional as well as uni-directional drive motors.

Figure 7:
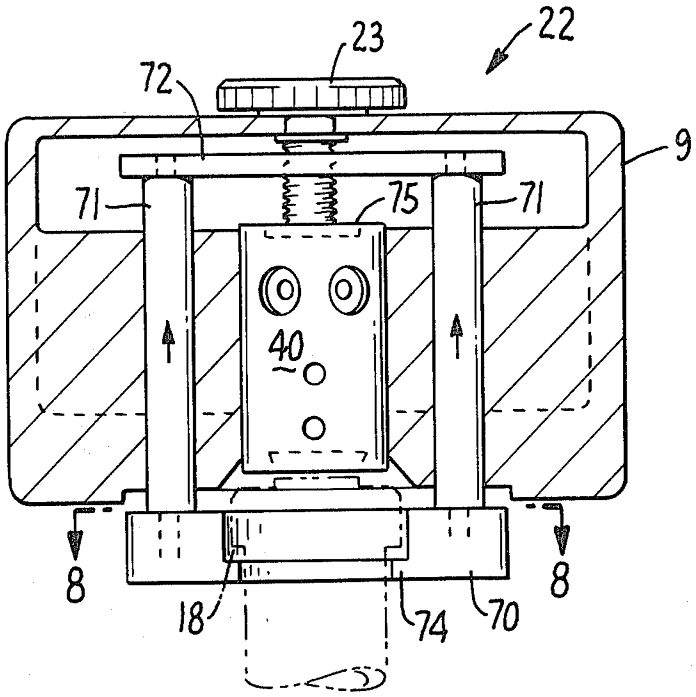
FIG. 7 is a vertical elevational view of the valve and clamping means for the syringe.
Figure 8:
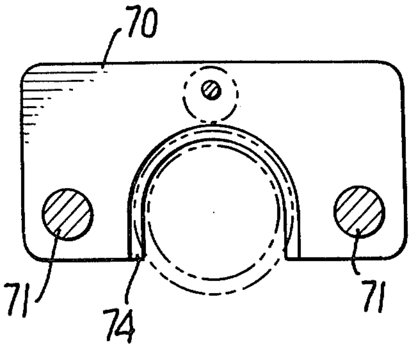
FIG. 8 is a plan view partly in section of the syringe clamping means taken along line 8—8 of FIG. 7.
Figure 9:
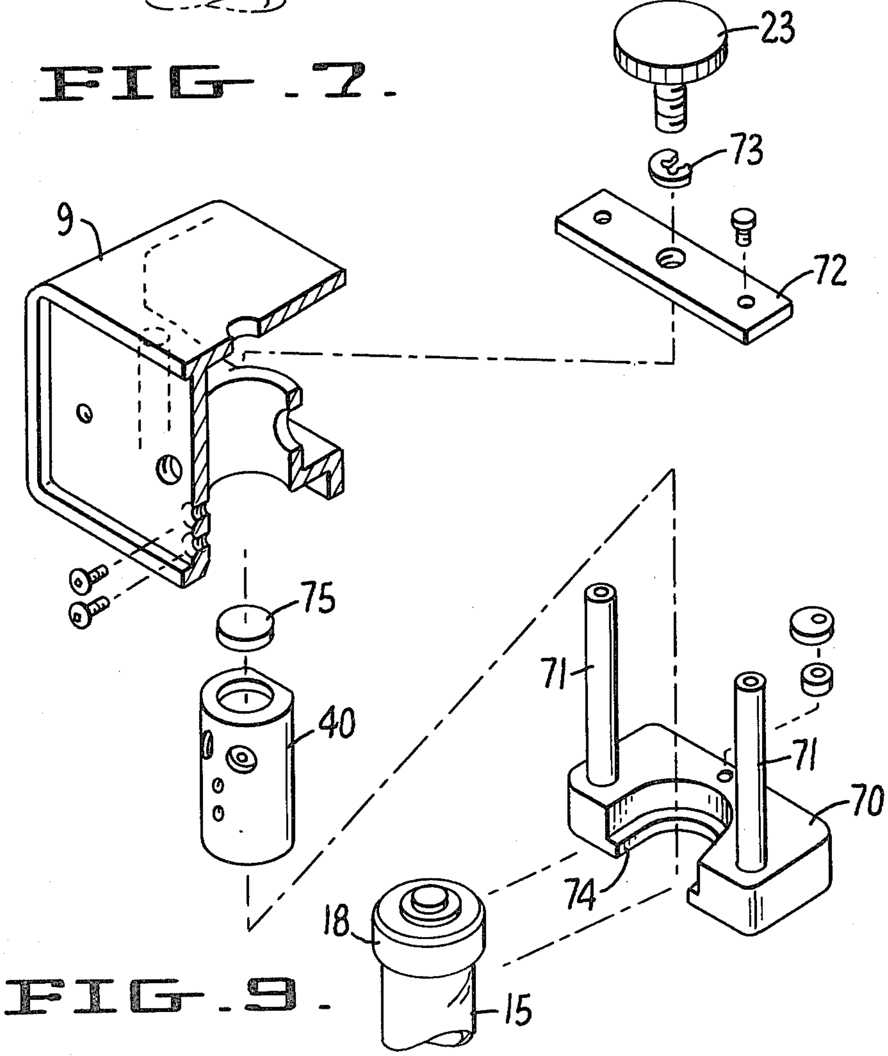
FIG. 9 is an exploded perspective view of the valve and clamping means for the metering syringe.

The clamping means referred to generally as 22 is illustrated in detail in FIGS. 7–9. It comprises a clamping plate 70 with an arcuate gripping flange 74 which embraces the connecting flange and seat 18 of the syringe 1 around 180° of its circumference as shown in FIGS. 8 and 9. A pair of rigid posts 71 connect the clamping plate 70 to jack plate 72 mounted across their opposite ends. Set screw 23 threaded into the jack plate 72 bears against metal insert 75 in the top of valve body 40. As set screw 23 threads downwardly, the clamp plate 70 is jacked up against the connecting flange 18 to seat it into fluid-tight engagement with gasket 20. Position is maintained by lock washer 73.

The valve body 40 within housing 9 mounts upon frame 8 in a fixed position relative to a syringe actuator of the type more particularly described in copending application Ser. No. 06/297,955 which also is mounted from the same frame 8. The full 180° engagement of gripping flange 74 around the connecting flange 18 assures alignment of the syringe, not only with syringe-communicating conduit 21, but also, with the stroking of the syringe actuator to prevent misalignment of the metering syringes.

Various modifications of the described valve and clamping construction may become apparent to those skilled in the art within the scope of the invention that is defined in the following claims.

We claim:

1. A dispenser valve comprising a valve body having a valve seat and ports passing through the surface of the valve seat each for communication with a separate fluid conduit;

a valve rotor having a seating face shaped in conformance with the valve seat and seated in fluid-tight contact with the valve seat;

a fluid communication groove formed in the rotor to communicate selectively a pair of valve ports with one another;

and spring bias means pressing the seating face of the rotor into fluid-tight contact with the valve seat including, a sleeved pressure pad embracing the rotor and having a receiving detent, a drive tang carrying a generally hemispherically shaped bearing end, and a spring biasing the drive tang bearing end into the pressure pad detent upon the rotor rotational axis.

2. The dispenser valve of claim 1 further comprising means for bidirectionally rotating the rotor wherein the drive tang is pinned to the rotor on an axis offset from the rotor drive axis.

3. A dispenser valve for fluid communication with the interior of a precision metering syringe which has a clamping flange comprising a valve body having a valve seat and ports passing through the surface of the valve seat each for communication with a separate fluid conduit;.

a valve rotor having a seating face shaped in conformance with the valve seat and seated in fluid-tight contact with the valve seat;

a fluid communication groove formed in the rotor to communicate selectively at least one pair of valve ports with one another;

spring bias means pressing the seating face of the rotor into fluid-tight contact with the valve seat;

valve actuator means for stepping the rotor from one set of port communication positions to another; and means clamping the open end of the metering syringe to the valve body in fluid communication with at least one of said ports including a gripping flange bearing upon the syringe clamping flange; and means for jacking the gripping flange toward the valve body and thereby move the syringe into fluid-tight engagement with said valve body.

4. The dispenser valve of claim 3 wherein the gripping flange encircles about 180° of the syringe clamping flange in clamping engagement.

* * * * *